United States Patent [19]

Wyman et al.

[11] 4,102,580

[45] Jul. 25, 1978

[54] SYSTEM FOR THE MEASUREMENT OF ULTRA-LOW STRAY LIGHT LEVELS

[76] Inventors: James C. Fletcher, Administrator of the National Aeronautics and Space Administration, with respect to an invention of Charles L. Wyman; Donald B. Griner; William A. Hurd; Glenn B. Shelton; Gary H. Hunt, all of Huntsville, Ala.; Bill B. Fannin; Robert P. Brealt, both of Tucson, Ariz.; Charles A. Hawkins, Arab, Ala.

[21] Appl. No.: 755,323

[22] Filed: Dec. 29, 1976

[51] Int. Cl.² .................. G01N 21/48; G01B 9/00
[52] U.S. Cl. ............................. 356/210; 356/124
[58] Field of Search ............ 356/209, 210, 211, 124; 250/237

[56] References Cited

U.S. PATENT DOCUMENTS 3,645,629  2/1972  Dagnall ............................ 356/87

OTHER PUBLICATIONS

C. Leinert et al., Stray Light Suppression in Optical Space Experiments, Mar. 1974, Applied Optics, pp. 556-564.

Primary Examiner—Vincent P. McGraw
Assistant Examiner—Rodney Bovernick
Attorney, Agent, or Firm—George J. Porter; John R. Manning; L. D. Wofford, Jr.

[57] ABSTRACT

An apparatus for measuring the effectiveness of stray light suppression light shields and baffle arrangements used in optical space experiments. The light shield and baffle arrangement and a telescope model are contained in a vacuum chamber. A source of short, high-powered light energy illuminates portions of the light shield and baffle arrangement and reflects a portion of same to a photomultiplier tube by virtue of multipath scattering. The resulting signal is transferred to time-channel electronics timed by the firing of the high energy light source allowing time discrimination of the signal thereby enabling the light scattered and suppressed by the model to be distinguished from the walls and holders around the apparatus.

17 Claims, 7 Drawing Figures

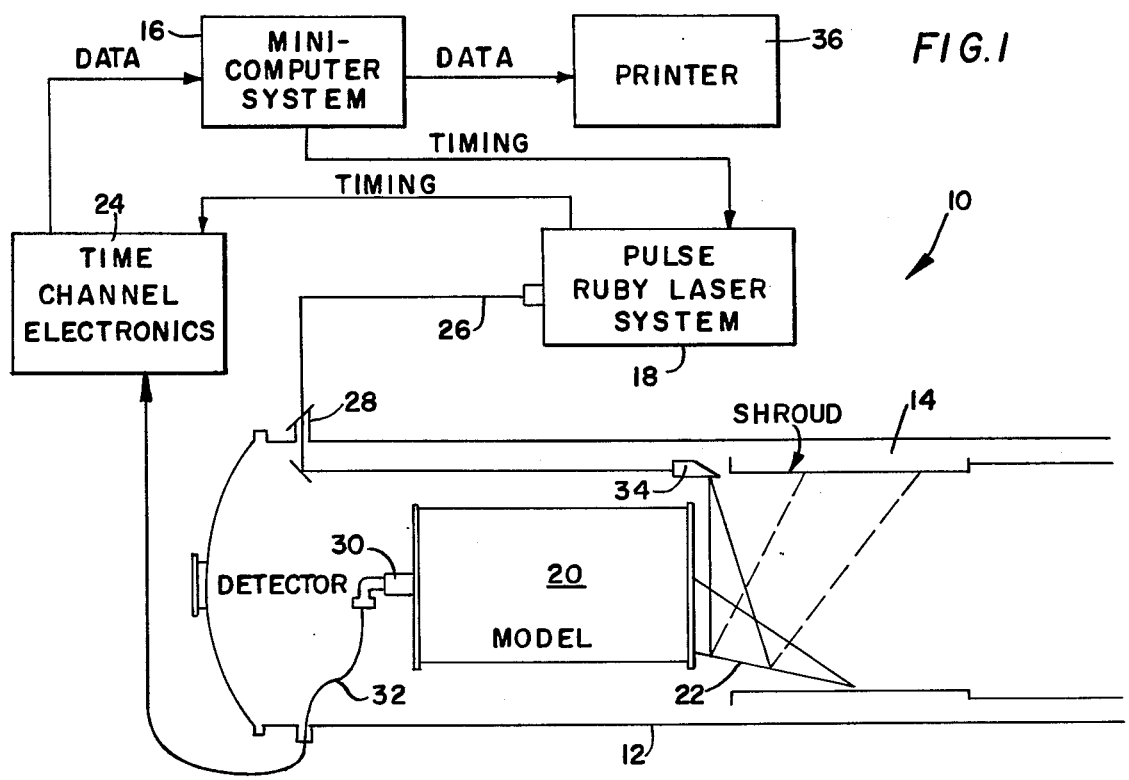
FIG.1
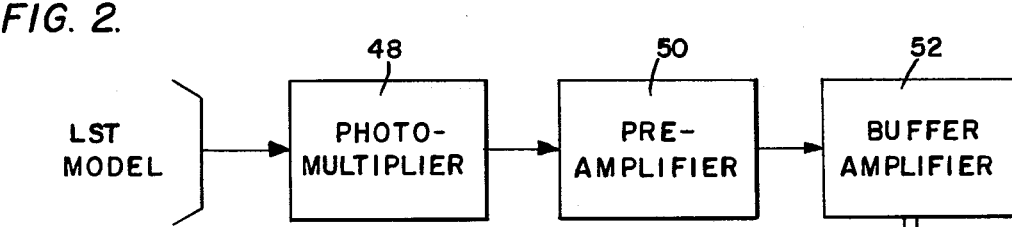
FIG. 2.
FIG. 4.
| FIG.3A. |
| --- |
| FIG.3B. |
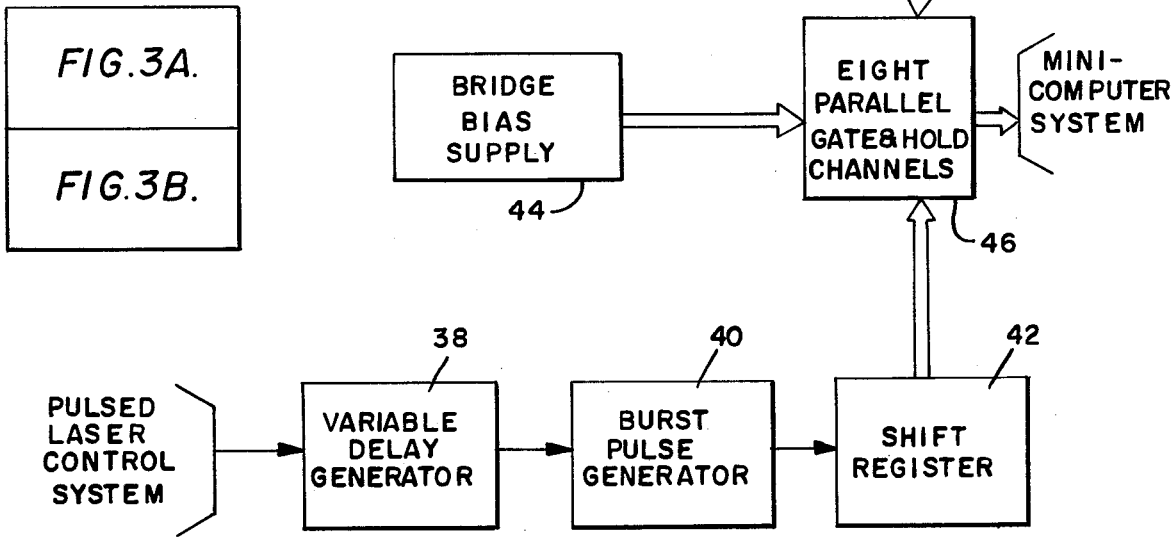

4,102,580

SYSTEM FOR THE MEASUREMENT OF ULTRA-LOW STRAY LIGHT LEVELS

ORIGIN OF THE INVENTION

The invention described herein was made in the performance of work under a NASA contract and is subject to the provisions of Section 305 of the National Aeronautics and Space Act of 1958, public law 85-568 (72 Stat. 435; 42 U.S.C. 2457).

FIELD OF THE INVENTION

The present invention relates to a measurement system for determining the effectiveness of a particular stray light suppression system. This system would have particular utility in testing the adequacy of a large space telescope (LST) system, or other space-borne environments.

BACKGROUND OF THE INVENTION

Known prior art systems for measuring ultra-low stray light levels have utilized either continuous or low frequency chopped light as a source. The major disadvantages of these systems have been the inability to distinguish between light scattered by the system under measurement and the light scattered from the walls and holders around the system. Additionally, most suppression systems of interest for space applications require very low attenuation with the prior systems being incapable of covering the necessary range.

The most authoritative work known on stray light suppression is a report by Lernert and Kluppelberg which is contained in *Applied Optics*, Volume 13, No. 3, March, 1974, pp. 556–564. This report includes analytical predictions and confirms measurements made from satellites for several space experiments. In comparison to the experiments reported by Lernert and Kluppelberg, the LST baffle design problem is much more severe since the LST is a very large spacecraft and, hence, is volumetrically constrained by its launch vehicle envelope. Additionally, the LST is to be launched by the space shuttle, the main result of this constraint being a relatively short length in front of the telescope structure or light shields and baffles. The experiments contained in the Lernert and Kluppelberg articles do not address and cannot alleviate these problems.

SUMMARY OF THE INVENTION

The system of the present invention is utilized to test whether a telescope such as a large space telescope (LST) adequately suppresses stray light reflected into its interior. This system would test the effectiveness of a particular baffle configuration within said telescope for suppressing the stray light.

A high energy source such as a laser delivers short high-energy pulses to the interior of a vacuum chamber surrounding a model of the LST. This energy is reflected off of a shroud surrounding the model and then onto the image plane of said model. A photomultiplier tube (PMT) senses the reflected energy and transmits signals to time channel electronics. These circuits are timed by the firing of the laser, and the resultant signal is loaded into eight consecutive time channels of 20 nsecs each. The time channels hold the data long enough for a mini-computer to digitize it. A printer then prints out the data for a particular baffle configuration. A computer program analyzes the data to determine the efficiency of this baffle configuration.

The above-described invention will be better understood from the following detailed description when considered in connection with the accompanying drawings.

BRIEF DESCRIPTION OF THE DRAWINGS

FIG. 1 is a schematic diagram of the LST stray light measurement facility;

FIG. 2 is a block diagram of the electronics utilized in the LST stray light measurement;

FIG. 4 is a diagram showing the relationship between FIGS. 3A and 3B.

DETAILED DESCRIPTION OF A PREFERRED EMBODIMENT

Figure 3A:
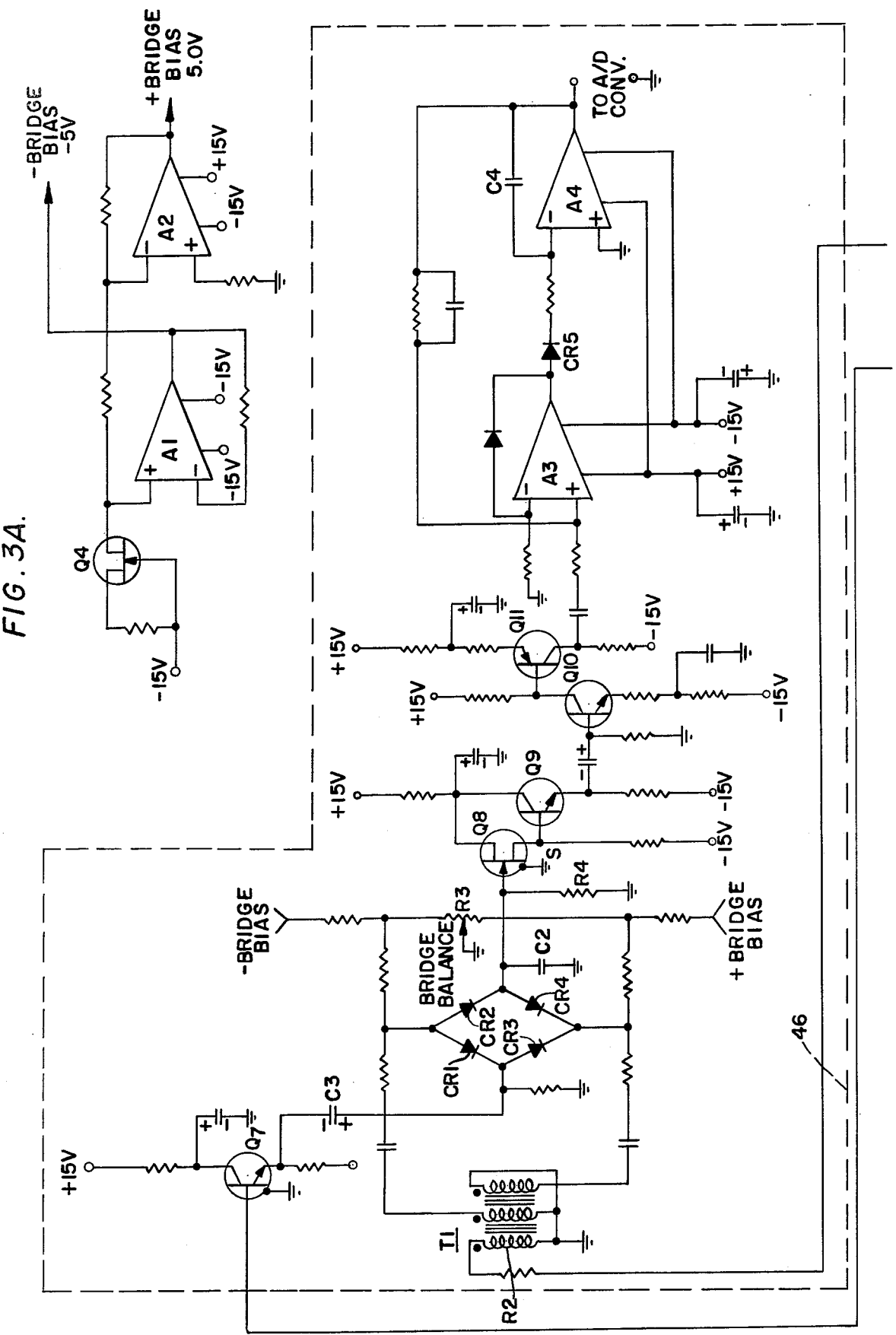
FIGS. 3A and 3B are schematic diagrams of the electronic circuitry of FIG. 2.

The essential features of the experimental measurement system 10 are shown in the schematic diagram of FIG. 1. A vacuum chamber 12 encloses a model 20 of the stray light suppression baffle and light shield system. Although the exact length of the chamber 12 is not essential, it has been found that a length of 100 meters has given satisfactory results. A CAT-A-LAC glossy black shroud 14 is used to suppress scattered light from the chamber walls and is approximately 6 meters long and extends from the front of the model 20. A mini-computer 16 controls the operation of the entire system and provides timing signals and processes the data.

A high powered light source such as a pulse ruby laser system 18 delivers a short high energy pulse, and this combined with time-channel electronics 24 and data processing techniques allows time discrimination to reject energy scattered from the chamber walls beyond the shroud 14. The model 20 contains a light shield and baffle system, the particular configuration of which is not important in the present invention. Also contained in this model is a scale model telescope such as a 50 cm diameter, $f/12$ Cassegrain telescope. The essential elements of the stray light suppression system include a sun shield 22 such as are constructed by the Itek Company.

The overall operation of the measurement system is as follows: the high powered laser system 18 supplies a 24 ns, 75 MW pulse at wavelength of 693.3 mm which passes through a Brewster window 28 into the vacuum chamber 12 where it is controlled and directed to the scale model 20 by way of a rotatable mirror 34. It should be noted that the exact frequency and wavelength of the laser is not crucial to the present invention. This mirror 34 can be controlled from the outside of the tunnel 12 to cause the energy to illuminate a number of positions on the sun shield 22 and along the front of the model 20.

FIG. 1 shows the rotatable mirror 34, for example, directing the laser beam 26 to two positions on the sun shield 22 (denoted by the solid lines). These positions correspond to beam angles of 60°, 70°, 80°, 90° and 100° with respect to the optical axis of the model. Energy that is reflected from these positions and finds its way to the image plane of the model is sensed by a photomultiplier tube (PMT) 30. The resulting signal (or signals) is amplified and transferred out of the tunnel to the time-channel electronics 24 by means of a coaxial cable 32. The time-channel electronics 24 are timed by the firing of the laser 18 and then the signal is loaded into eight consecutive time-channels of 20 nsecs each. This allows time discrimination of the signal. The time channels hold the data long enough for the computer 16 to complete digitization. At this point, a printer 36 records the data that was read by the eight time channels. The print out is in the range between 0 and 10,000 millivolts. The computer 16 sums the eight voltages and stores the sums until 10 firings are completed. The ten sums and the average of these sums is printed for the use in the calculation of the magnitude of the stray light suppression.

The gain factor of a typical photomultiplier tube 48 utilized was calibrated and found to be $2.2 \times 10^3$ amps anode current per watt of incident light. The combined gains of the amplifiers gives $2.27 \times 10^5$ volts out per amp input. Combining these two factors gives an overall gain of $5 \times 10^8$ volts out per watt incident on the photocathode. The output of the laser is measured in joules. The gain factor converts to $4 \times 10^{-17}$ joules/volt for the sum of the eight time channels. A limiting aperture is used in front of the photocathode in order to control the dynamic range of its input, and will be used later to plot the illumination over the image plane. The computer analysis program divides the image plane into 25 segments and calculates the energy level expected in each segment. The ratio of the segment area to the apertured area (13.5) must be considered when comparing the measured suppression with the computed value. This changes the gain factor to $5.4 \times 10^{-16}$ joules/volt. The efficiency of the beam transfer optics between the laser and sun shield was measured and found to be 18.1%. Dividing this number by the gain factor gives an equation for calculating a stray light suppression factor:

$$\alpha = 3.36 \times 10^{14} (E_L/V_s)$$

where $\alpha$ = the suppression factor, $E_L$ = the energy in joules, $V_s$ = the sum of the eight time channel outputs in volts. The stray light transmission factor is equal to $1/\alpha$.

A block diagram of the time channel electronics 24 is shown in FIG. 2. A timing signal from the pulsed ruby laser control system is received by a variable delay generator 38, whereby a delay can be optimized by centering the sampling signals on the light pulse received by the PMT 48. After the established delay time has elapsed, a burst pulse generator 40 is activated, causing eight sampling pulses to be routed through a shift register 42 to the gate and hold channels 46.

The photomultiplier 48 is positioned at the image plane of the LST model and receives energy from the pulse ruby laser after it has been greatly attenuated by the light shield and baffle system of the model 20. This energy is converted to a voltage pulse by a preamplifier 50, designed for low noise and very wide band operation to preserve pulse fidelity. The preamplifier 50 is mounted in close proximity to the photomultiplier to establish impedance matching and is designed to drive an approximately 20-foot coaxial cable 32 necessary to transfer the signal out of the vacuum tunnel to a buffer amplifier 52. The buffer amplifier 52 is also wide band and provides the proper load for the cable and the gain necessary to increase the pulse amplitude to the proper level for driving eight gate and hold channels 46.

These gate and hold channels 46 receive voltage signals which represent the scattered light from the laser pulse, and under control of the sampling pulses produced by the shift register 42 provide time discrimination against random or undesired laser pulse echoes. These eight channels are opened sequentially to sample the pulse from the buffer amplifier 52 at 20 nsec intervals. During the 20 nsec that each channel is opened, its output follows the input and after the gate closes, the output is held for a duration long enough for the mini-computer 16 to convert and store a digital representation of the analog value seen by each channel at the time of gate closures.

A bridge bias supply 44 assures a balanced, stable, back bias on the video sampling gates so that no off-set is produced when the gates are opened.

Figure 3B:
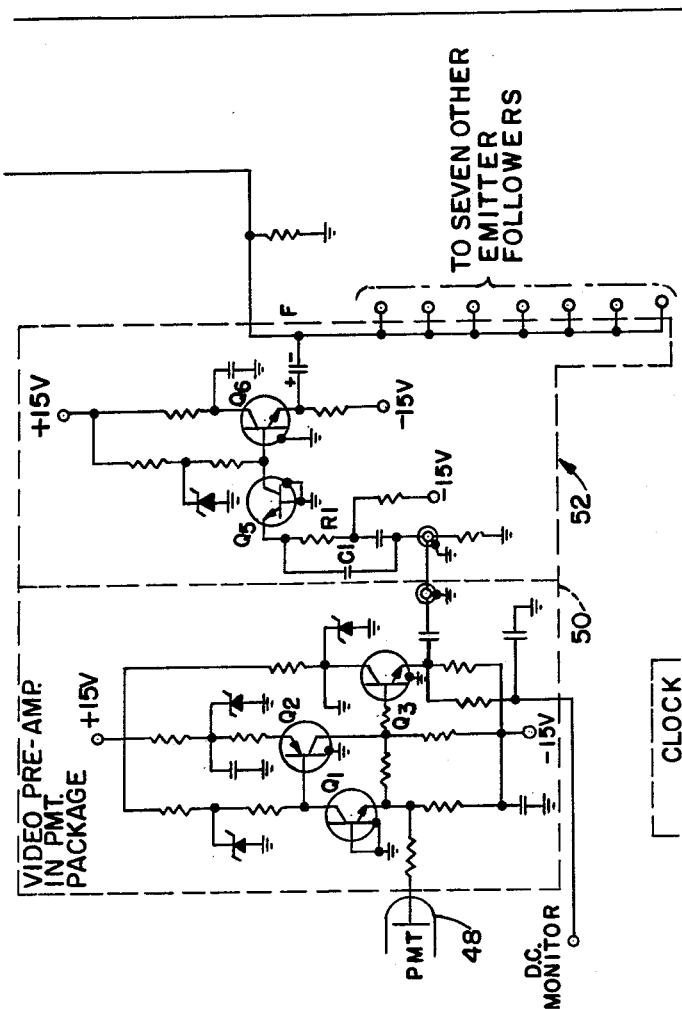
Figure 3B:
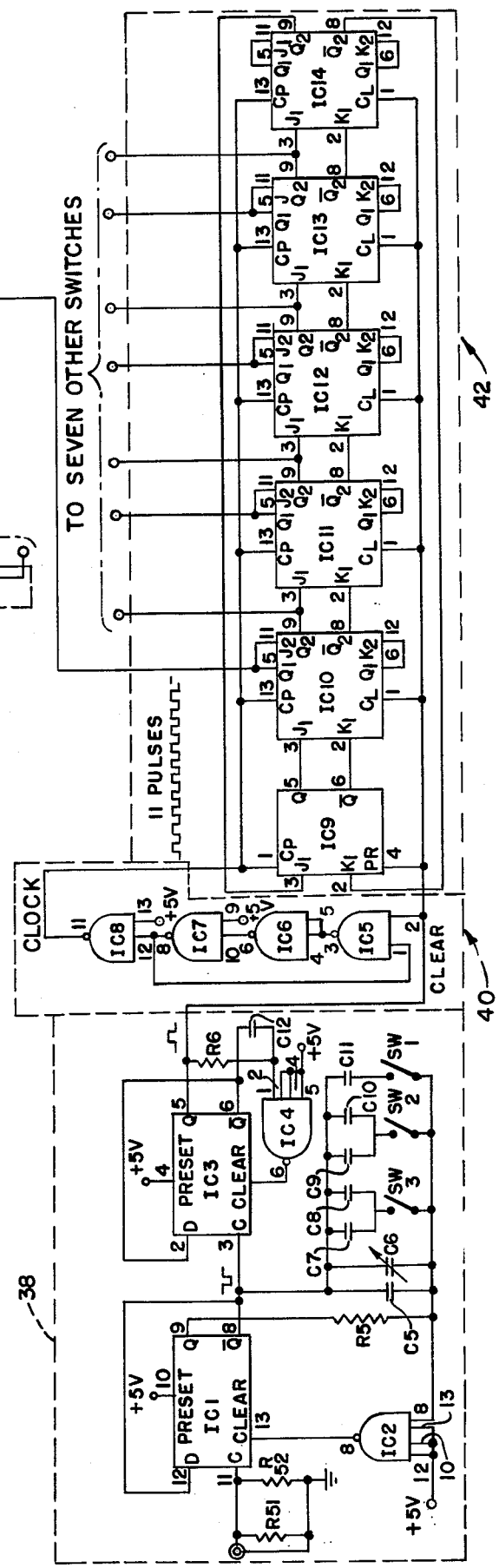

FIG. 3 is a schematic diagram of the electronic circuitry shown in FIG. 2 showing only a single gate and hold circuit 46. The video preamplifier 50 contains transistors $Q_1$, $Q_2$ and $Q_3$. Input stage $Q_1$ provides current-to-voltage conversion and is connected in a grounded base configuration to provide optimum noise-bandwidth performance with the photomultiplier 48 as a driving current source. Stage $Q_2$ provides voltage grain and stage $Q_3$ is an emitter follower designed to match the impedance of the connecting coaxial cable 32. Although the exact gain factor is not crucial, a typical preamplifier utilized in the circuitry of the present invention could provide a gain factor of 1250 volts/amps into a 50 ohm cable and a 3dB bandwidth of 120 MHz.

The buffer amplifier 52 containing transistors $Q_5$ and $Q_6$ is designed to match the impedance of the cable 32 to the preamplifier 50 and to supply the drive signal to the eight gate and hold channels 46. This stage provides a voltage gain of 4 and a bandwidth of 135 MHz. Capacitor $C_1$ and resistor $R_1$ compensate for the increased input impedance of $Q_5$ at higher frequencies.

Each gate and hold channel 46 contains three stages: a video sampling bridge, a bridge buffer amplifier and a peak detector. FIG. 3 shows only a single gate and hold channel, however, it can be appreciated that each sampling pulse requires a separate and distinct gate and hold channel connected in a manner similar to that shown in FIG. 3. Although connections for eight of such channels are noted in FIG. 3, the exact number utilized is not crucial to the present invention.

The main components of the video sampling bridge are transformer $T_1$, transistor $Q_7$ and diodes $CR_1$–$CR_4$. The other resistors and capacitors shown in this section provide bias and impedance matching. The video signal is applied through capacitor $C_3$ by emitter follower $Q_7$. A gating signal is applied through resistor $R_2$ to transformer $T_1$. Transformer $T_1$ is a wide band, trifilar wound, toroidal transformer. When a positive pulse is applied to the primary, $T_1$ supplies a balance forward bias pulse to the bridge containing $CR_1$–$CR_4$. This forward bias pulse is sufficient to overcome the normal bridge back bias and the video signal is passed to capacitor $C_2$. This capacitor and the diode bridge form a short-term sample and hold circuit with a charge time of approximately 3 nsecs and a holding time sufficient to drive the bridge buffer amplifier and peak detector. Control resistor $R_3$ is adjusted to null any offset applied to capacitor $C_2$ when the bridge is sampling a zero signal from transistor $Q_7$.

The active components of the bridge buffer amplifier are field effect transistor (FET) $Q_8$ and transistors $Q_9$, $Q_{10}$ and $Q_{11}$. In order to extend the holding time of the sampling bridge while maintaining a fast sampling time, capacitor $C_2$ should be of small value and the resistive component of the bridge load should be as large as practical. Noise considerations demand a practical high limit for the resistive component. The compromise was met by utilizing $R_4$ as the gate return for FET $Q_8$ connected as a source follower, driving emitter follower $Q_9$. Transistors $Q_{10}$ and $Q_{11}$ give voltage gain and drive the peak detector. In this stage, a rise time in the microsecond region is sufficient.

Integrated circuit amplifiers $A_3$ and $A_4$ are connected to produce a positive peak detector. The positive going output of the bridge buffer amplifier is applied to the input of the peak detector. Stage $A_3$ buffers the integrated stage $A_4$, with an overall stage gain of unity. The output of $A_4$ gives a negative reproduction of the input until the input reaches its peak value. This peak is held by capacitor $C_4$ and diode $CR_5$ except for a slow decay due to leakage resistance. The peak detector gives a linear charge time of 12 microseconds for a 0–10 volts signal and a linear decay time of approximately 200 milliseconds from 10–0 volts.

Integrated circuits $I_{C1}$–$I_{C4}$ provide the active components of the variable delay generator 38. The positive going edge of the trigger signal from $J_3$ sets the Q output of $I_{C1}$ high. This output is sensed by the integrating network formed by resistor $R_5$, capacitors $C_5$–$C_{11}$ and switches $S_1$–$S_3$. A selectable configuration or charging rate is controlled by the setting of the switches. Schmitt trigger $I_{C2}$ is controlled by the integrator. The output of the integrator goes low and sets $I_{C1}$ when the output level reaches the trip point. On reset, the $\overline{Q}$ output of $I_{C1}$ goes high, causing the Q output of $I_{C3}$ to also go high. The output of $I_{C3}$ remains high until reset by $I_{C4}$ which is controlled by resistor $R_6$ and capacitor $C_{12}$. This output enables the burst pulse generator 40 and the shift register 42.

The burst pulse generator 40 is formed by integrated circuits $I_{C5}$–$I_{C8}$ and controlled by the output of the variable delay generator 38. In the inhibited state (input low), the output of $I_{C7}$ is high and is connected to one side of NAND gate $I_{C5}$. When the input goes high (enable), the output of $I_{C7}$ goes low. The period of the oscillation is 20 nsecs and the input pulse width is preset to allow the number of pulses out of $I_{C8}$ to be equal to these stages in the shift register 42.

The shift register 42 contains dual J-K flip flops $I_{C9}$–$I_{C14}$. These flip flops are connected to form a standard ring type shift register. In the quiescent state, the variable delay generator 38 holds $I_{C9}$ in present (Q output high) and $I_{C10}$–$I_{C14}$ in the reset condition (Q low). When the delay generator 38 output goes high, the shift register and the burst pulse generator 40 are enabled. The first negative going transition from the burst pulse generator causes the high state from $I_{C9}$ to be shifted to the $Q_1$ output of $I_{C10}$. The next going transition causes $Q_1$ to go low and $Q_2$ of $I_{C10}$ to go high. In this manner, the high state is moved through the shift register causing each output to be high sequentially for 12 nsecs apiece.

It should be noted that the circuits described in the present invention were designed to meet requirements of the particular application to a LST stray light suppression experiment. It was not intended that the present invention be limited to the exact circuitry disclosed. Improved equipment would require modifications in the electronics and could improve the measurements made with this system. One change which would increase the time discrimination characteristic is to shorten the pulse length of the laser. The degree of modification in the electronics would depend upon the width of the laser pulse as compared with the 25 nsecs in the system disclosed herein. For a pulse width with about 10 nsecs, only the burst pulse generator 40 and shift register 42 would have to be modified. Additionally, increasing the number of gate and hold channels 46 would also improve the measurement results.

Extremely sensitive time discrimination could be produced if a laser pulse width of 2 or 3 nsecs was available. With this laser, all the electronics, with the exclusion of the preamplifier 50, should be replaced with a transient digitizer system. The Tektronix-R7912 Transient Digitizer could be used to record and store as many as 512 samples in as short a time window as 5 nsecs.

One use of data obtained by the stray light measurement system is to validate a computer program used for design and evaluation of stray light baffle systems. The computer program calculates the amount of unwanted radiation which reaches the image plane of an optical system. Of specific concern are bright objects outside the field of view that illuminate the internal structure of the telescope which in turn acts as a source of scattered light that may eventually find its way to the image plane. The primary sources of unwanted scattered light for the LST are the Earth, moon and sun.

The general problem of computing scattered radiation requires either Monte Carlo calculations to determine the probability associated with the scattering of protons from surface to surface, or power transfer calculations from surface to surface must be made using analystical or measured values for scattering distribution functions. Either way, enormous numbers of computations must be made for all possible paths in order to establish the intensity of scattered light at the image plane with sufficient accuracy. Complex systems such as the LST require very high attenuation of stray light and therefore pose very severe computational difficulties. The computer program reduces the severity of these difficulties in two ways: one, paraxial ray tracing has been found to provide sufficient computational accuracy for the problem; hence greatly reducing the difficulty of the calculation as compared to exact ray traces; two, the number of power transfer calculations required to be traced is greatly reduced by first tracing backward through the system of the image plane to determine what surfaces contribute to scattered light at the focal plane.

The computer program is comprised of five major subprograms. The first subprogram is used to determine exactly which surfaces are seen on the image plane. By tracing backward through the system, one can systematically determine which surfaces are the main contributors to unwanted light in the image plane. This subprogram is used to provide inputs to subsequent subprograms in the form of positions and angles of contributing surfaces throughout the system. Any contributing surface seen by any other contributing surface is broken down into five segments with associated position and angles. This particular subprogram is limited to real surfaces.

The surfaces imaged by the optical system can also contributed to unwanted radiation at the image plane. The second subprogram analyzes these imaged surfaces. It is similar to the first subprogram except that it lays out the imaged surfaces as seen from the image plane, and also lays out the imaged surfaces as seen by real surfaces to determine where light can scatter from. Since these calculations involve the optical system, paraxial ray traces are performed using the Y-YBar diagram described by Erwin Delano in "First Order Design in the Y,Y Diagram", appearing in *Applied Optics*, Volume 2, No. 2, December, 1963. This subprogram provides numerical data to subsequent subprograms pertaining to the image surfaces. The data includes distances, heights, Y, YBar and data on surfaces imaged at infinity.

The third subprogram treats any surface designated by the second subprogram as a source of radiation to other surfaces, including imaged surfaces. This subprogram provides information for use by subsequent subprograms: (1) the percentage of power transferred from each source surface to each collector surface is computed; (2) angles from which power is transferred from each source is computed; (3) the angles of power transfer into the collectors is computed; (4) more detailed information is stored for later use.

The fourth subprogram is utilized to load power onto surfaces internal to the telescope from external surfaces (the Earth, moon and sun). The specific inputs and outputs to this subprogram are clearly peculiar to the specific sources being utilized and the specific design being analyzed. An input file is created by this subprogram.

The fifth subprogram is a driver for the rest of the programs. This and the third subprogram is where the bulk of the power transfer computations take place. Scattered light levels are computed throughout the system. The input to this subprogram is necessarily very large drawing from all the previously calculated files. This subprogram sums over various scattering paths and prints information on all scattered light to the image plane enabling the user to gain insight as to the main surface contributing to unwanted light. This information provides the user with the basis for design changes, and system improvement.

While this invention has been described in great detail, it would be obvious to those skilled in the art that various changes may be made without departing from the scope of the invention, and the invention is not to be considered limited to what is shown in the drawing and described in the specification. The specific use of eight time channels of 20 nsecs each per time discrimination is not the only combination that can be used. Any number of detectors in time discrimination circuits could also be utilized. The important feature is the ability to time discriminate against background scatter from areas other than the system under test. The light source is also not unique. In this case, a ruby laser light source was used, but any high power or short pulse light source could also have been utilized. Another possible change in the system used is the vacuum chamber size. A 100 meter tunnel is used in this case, by any length greater than 6 meters in front of the model would also be sufficient. The important feature is to have a chamber large enough to time discriminate from reflections in the field of view of the model under test.

Furthermore, with certain modifications, the measurement system of the present invention could be used to investigate the efficiency of any energy attenuating system such as acoustics or microwaves. If, for instance, the acoustical attenuation of a certain damping arrangement were desired, acoustical energy would be introduced to the model containing a sound detector for converting the energy sensed into an analog voltage. This voltage signal (or signals) would then be treated in the manner shown in FIGS. 1, 2, 3A and 3B, similar to that of the voltage produced by the photodetector shown in FIG. 1. For acoustics, it must be understood that the measurements cannot be made in a vacuum chamber. They must be made in air or some other transporting media. For either microwaves or acoustics, the side of the model would have to be much larger than previously described above.

What is claimed is:
1. A stray light suppression measurement system for determining the effectiveness of a light suppression arrangement comprising:
   a vacuum chamber enclosing the light suppression arrangement;
   light generating means for producing a short-pulsed high power light beam illuminating a portion of the light suppression arrangement;
   detector means provided within the light suppression arrangement for sensing the light reflected onto the image plane of the arrangement, said detector means producing an analog signal; and
   time discrimination electronic means connected to said detector means and triggered by the firing of said light generating means for producing a plurality of sample signals into which said analog signal produced by said detector means is loaded thereby producing a time discriminating signal.

2. A stray light suppression measurement system in accordance with claim 1, further including a computer means electronically connected to said electronic means and said light generating means for digitizing said signals produced by said detector means.

3. A stray light suppression measurement system in accordance with claim 2 further including a printer connected to said computer means for recording the data read by said sampling signals.

4. A stray light suppression measurement system in accordance with claim 1 wherein said time discrimination electronic means includes:
   delay means connected to said light generating means for optimizing the relationship between said sampling signals and said signal produced by said detector means;
   generator means connected to said delay means for generating said sampling signals;
   holding means connected to said generating means and said detector means for holding said sampling signals and for sampling the signal produced by said detector means.

5. A stray light suppression measurement system in accordance with claim 4 further including a bridge bias supply connected to said holding means.

6. A stray light suppression measurement system in accordance with claim 1 wherein said detector means includes a photomultiplier tube and a video preamplifier.

7. A stray light suppression measurement system in accordance with claim 4 wherein said generator means includes a burst pulse generator and shift register.

8. A stray light suppression measurement system including:
   a vacuum chamber adapted to enclose a light suppression arrangement;
   light generating means for producing a short-pulsed high power light beam illuminating a portion of the light suppression arrangement;
   detector means provided within the light suppression arrangement for sensing the light reflected onto the image plane of the arrangement, said detector means producing an analog signal; and
   time discrimination electronic means connected to said detector means and triggered by the firing of said light generating means for producing a plurality of sample signals into which said analog signal produced by said detector means is loaded thereby producing a time discrimination signal.

9. A stray light suppression measurement system in accordance with claim 8, further including a computer means electronically connected to said electronic means and said light generating means for digitizing said signals produced by said detector means.

10. A stray light suppression measurement system in accordance with claim 9 further including a printer connected to said computer means for recording the data read by said sampling signals.

11. A stray light suppression measurement system in accordance with claim 8 wherein said time discrimination electronic means includes:
delay means connected to said light generating means for optimizing the relationship between said sampling signals and said signal produced by said detector means;
generator means connected to said delay means for generating said sampling signals;
holding means for holding said sampling signals and for sampling the signal produced by said detector means.

12. A stray light suppression measurement system in accordance with claim 11 further including a bridge bias supply connected to said holding means.

13. A stray light suppression measurement system in accordance with claim 8 wherein said detector means includes a photomultiplier tube and a video preamplifier.

14. A stray light suppression measurement system in accordance with claim 11 wherein said generator means includes a burst pulse generate and shift register.

15. A method for measuring the effectiveness of a light suppression arrangement comprising the steps of:
producing a short-pulsed high power light beams;
illuminating a portion of the light suppression arrangement with said high power light beam;
detecting the portion of said high power light beam reflected onto the image plane of the light suppression arrangement;
converting the signal detected by said detecting step into an analog signal;
loading said analog signal into a plurality of sample signals timed to the production of said high power light beam thereby producing a time discriminating signal;
digitizing said time discriminating signals; and
analyzing said digitized signals to determine the efficiency of the light suppression arrangement.

16. A method for measuring the effectiveness of an energy suppression arrangement comprising the steps of:
producing a high power energy beam;
exposing a portion of the energy suppression arrangement with said high power energy beam;
detecting the portion of said high power energy beam reflected onto the plane of the energy suppression arrangement;
converting the signal detected by said detecting step into an analog signal;
loading said analog signal into a plurality of sample signals timed to the production of said high energy beam, thereby producing a time discriminating signal; and
analyzing said digitized signals to determine the efficiency of the energy suppression arrangement.

17. An energy suppression measurement system for determining the effectiveness of an energy suppression arrangement comprising:
energy generating means for producing a high power energy beam irradiating a portion of the energy suppression arrangement;
detector means provided within the energy suppression arrangement for sensing the energy reflected onto the plane of the arrangement, said detector means producing an analog signal;
time discrimination electronic means connected to said detector means and triggered by the firing of said energy generating means for producing a plurality of sample signals into which said analog signal produced by said detector means is loaded thereby producing a time discriminating signal.

* * * * *